United States Patent
Grossman et al.

(10) Patent No.: US 6,843,861 B2
(45) Date of Patent: Jan. 18, 2005

(54) METHOD FOR PREVENTING THE FORMATION OF SECONDARY REACTION ZONE IN SUSCEPTIBLE ARTICLES, AND ARTICLES PREPARED BY THE METHOD

(75) Inventors: Theodore Robert Grossman, Hamilton, OH (US); Ronald Gustav Rajala, Loveland, OH (US); Dwayne Edward Burnett, Liberty Township, OH (US); William Scott Walston, Mason, OH (US); Wendy Howard Murpjy, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 355 days.

(21) Appl. No.: 10/071,129

(22) Filed: Feb. 8, 2002

(65) Prior Publication Data

US 2003/0150901 A1 Aug. 14, 2003

(51) Int. Cl.$^7$ .......................... C23C 8/04; B32B 15/10; B41M 3/12
(52) U.S. Cl. ....................... 148/280; 148/516; 148/535; 228/208; 428/652; 427/142
(58) Field of Search ................................. 148/280, 576, 148/535; 29/889.1, 889.21, 889.22; 228/225, 254, 208, 203, 193, 199; 428/533, 652; 427/140, 142, 327, 328

(56) References Cited

U.S. PATENT DOCUMENTS

| | | | |
|---|---|---|---|
| 4,746,369 A | | 5/1988 | Sullivan et al. |
| 5,270,123 A | * | 12/1993 | Walston et al. ............. 428/652 |
| 5,334,263 A | | 8/1994 | Schaeffer |
| 5,455,120 A | * | 10/1995 | Walston et al. ............. 428/652 |
| 5,598,968 A | | 2/1997 | Schaeffer et al. |
| 5,695,821 A | * | 12/1997 | Murphy et al. ............. 427/327 |
| 5,935,353 A | | 8/1999 | Murphy et al. |
| 6,036,995 A | * | 3/2000 | Kircher et al. ............. 427/142 |
| 6,042,879 A | * | 3/2000 | Draghi et al. ............... 427/142 |
| 6,066,405 A | | 5/2000 | Schaeffer |
| 6,332,926 B1 | | 12/2001 | Pfaendtner et al. |
| 6,355,116 B1 | * | 3/2002 | Chen et al. .................. 148/280 |
| 6,502,304 B2 | * | 1/2003 | Rigney et al. ........... 29/889.21 |
| 6,551,423 B1 | * | 4/2003 | Spitsberg et al. ........... 148/518 |
| 2002/0094445 A1 | * | 7/2002 | Sangeeta et al. ............ 428/553 |
| 2003/0021892 A1 | * | 1/2003 | Conner et al. .............. 427/142 |
| 2003/0062401 A1 | * | 4/2003 | Hasz et al. .................. 228/254 |

FOREIGN PATENT DOCUMENTS

| | | |
|---|---|---|
| EP | 0821076 A1 | 1/1998 |
| EP | 1136593 A1 | 9/2001 |
| EP | 0821076 B1 | 11/2001 |

* cited by examiner

Primary Examiner—L. Edmondson
(74) Attorney, Agent, or Firm—Gregory O. Garmong; Carmen Santa Maria; McNees Wallace & Nurick LLC

(57) ABSTRACT

A coated nickel-base superalloy article, which is otherwise susceptible to the formation of a secondary reaction zone, is prepared by furnishing a nickel-base superalloy article substrate having thereon an initial aluminum-containing coating comprising an initial-coating additive zone and an initial-coating diffusion zone. The article is susceptible to the formation of the secondary reaction zone if heated to an elevated SRZ reaction temperature for an SRZ reaction period of time. The formation of the secondary reaction zone is avoided by first removing the initial-coating additive zone and the initial-coating diffusion zone, and thereafter depositing a subsequent aluminum-containing coating onto the article substrate. The subsequent aluminum-containing coating includes a subsequent-coating additive zone and a subsequent-coating diffusion zone. The article substrate with the subsequent aluminum-containing coating is otherwise susceptible to the formation of the secondary reaction zone if heated to the elevated SRZ reaction temperature for the SRZ reaction period of time.

21 Claims, 3 Drawing Sheets

METHOD FOR PREVENTING THE FORMATION OF SECONDARY REACTION ZONE IN SUSCEPTIBLE ARTICLES, AND ARTICLES PREPARED BY THE METHOD

This invention relates to the preparation of nickel-base superalloys coated with an aluminide coating and more particularly to such superalloys which would otherwise be susceptible to the formation of a secondary reaction zone.

BACKGROUND OF THE INVENTION

In an aircraft gas turbine (jet) engine, air is drawn into the front of the engine, compressed by a shaft-mounted compressor, and mixed with fuel. The mixture is burned, and the hot exhaust gases are passed through a turbine mounted on the same shaft. The flow of combustion gas turns the turbine by impingement against an airfoil section of the turbine blades, which turns the shaft and provides power to the compressor and fan. In a more complex version of the gas turbine engine, the compressor and a high pressure turbine are mounted on one shaft, and the fan and low pressure turbine are mounted on a separate shaft. The hot exhaust gases flow from the back of the engine, driving it and the aircraft forward.

Nickel-base superalloys are used in many of the highest-temperature materials applications in the aircraft gas turbine engine. For example, nickel-base superalloys are used to fabricate the high-pressure and low-pressure gas turbine blades. These turbine blades are subjected to extreme conditions of both stress and environmental conditions. The compositions of the nickel-base superalloys are engineered to carry the stresses imposed upon the blades, both at low temperatures and at high temperatures. Protective coatings are typically applied to the gas turbine blades to protect them against environmental attack by the hot, corrosive combustion gases.

A widely used protective coating is an aluminum-containing coating termed a diffusion aluminide coating. An aluminum-containing layer is deposited upon the surface of the superalloy article. During the deposition process and subsequently in service, the aluminum-containing layer interdiffuses with the substrate material and also oxidizes at its exposed surface to produce an aluminum oxide scale. After its initial formation, this aluminum oxide scale thickens only relatively slightly and remains highly adherent to the underlying material. The aluminum oxide scale thus protects the underlying aluminide coating and substrate against further oxidation and corrosion damage. Optionally, a ceramic thermal barrier coating may be applied overlying the aluminide coating and its aluminum oxide scale.

This approach to the formation of a protective coating is highly successful and widely used for many types of nickel-base superalloys. With other advanced superalloys, however, problems may arise. For example, rhenium is added to some nickel-base superalloys for improved mechanical properties. When such an enhanced-rhenium article is coated with an aluminide coating and then subjected to a sufficiently high temperature for a sufficiently long exposure time, the aluminum of the coating chemically reacts with the rhenium of the article substrate to form a secondary reaction zone (SRZ). The SRZ forms as acicular precipitates extending in a brittle layer inwardly into the article substrate for distances of up to about 0.010 inches, weakening the article substrate to that depth.

A substantial weakening of a depth of 0.010 inches of material may not be a concern in some applications. However, the gas turbine blades are usually hollow with typical wall thicknesses of 0.020–0.060 inches, or have other thickness dimensions within this range. A weakening of 0.010 inches of the depth of such a hollow gas turbine blade means that 15–50 percent of the wall thickness is weakened, greatly compromising the functionality of the turbine blade.

The problem of SRZ in aluminum-coated high-rhenium nickel-base superalloys alloys has been recognized, and various techniques to avoid the formation of SRZ have been proposed. See, for example, U.S. Pat. Nos. 5,935,353; 5,334,263; and 5,598,968. These approaches are operable in many situations, but not in others. For example, they provide no remedy in cases where the substrate article has already been subjected to processing that otherwise leads to the formation of the SRZ, and a restoration or repair is required.

There is accordingly a need for additional approaches for avoiding SRZ formation. The present invention fulfills this need in part, and further provides related advantages.

SUMMARY OF THE INVENTION

The present invention provides a method for coating otherwise-susceptible nickel-base superalloys to minimize, and preferably prevent, the formation of a secondary reaction zone (SRZ), in cases where the article has already been processed in a manner that the formation of an SRZ is expected. The result is that the strength properties of the article are minimally compromised by the presence of SRZ. The present approach may be used to repair such articles, minimizing the subsequent formation of SRZ while still providing an aluminide protective coating (including both simple and modified aluminides). The present approach may also be used to pre-condition articles to minimize SRZ formation after the final aluminide coating is deposited.

A method is provided for preparing a coated nickel-base superalloy article that is otherwise susceptible to the formation of a secondary reaction zone. The method comprises first furnishing a nickel-base superalloy article substrate having thereon an initial aluminum-containing coating comprising an initial-coating additive zone and an initial-coating diffusion zone. The article is susceptible to the formation of the secondary reaction zone if heated to an elevated SRZ reaction temperature for an SRZ reaction period of time. The initial-coating additive zone and the initial-coating diffusion zone are thereafter removed to expose a newly exposed surface that is substantially without cold work and residual stress. A subsequent aluminum-containing coating is thereafter deposited onto the newly created surface of the article substrate. The subsequent aluminum-containing coating includes a subsequent-coating additive zone and a subsequent-coating diffusion zone.

The article substrate with the subsequent aluminum-containing coating is otherwise susceptible to the formation of the secondary reaction zone if heated to an elevated SRZ reaction temperature for an SRZ reaction period of time. However, due to the prior presence of the initial aluminum-containing coating and its removal in the prescribed fashion, the subsequent aluminum-containing coating does not result in the formation of the secondary reaction zone even when the article with the subsequent aluminum-containing coating thereon is heated to the SRZ elevated reaction temperature for the SRZ reaction period of time.

The nickel-base superalloy article typically has a rhenium content of not less than about 4.0 percent by weight. In one preferred application, the nickel-base superalloy article is made of the alloy René N6.

The removal of the initial-coating additive zone and the initial-coating diffusion zone is preferably performed without introducing cold work into the article substrate, as with an acid stripping process. Desirably, after the step of removing and before the step of depositing, the article substrate is stress relieved.

In another embodiment, a method for preparing a coated nickel-base superalloy article that is otherwise susceptible to the formation of a secondary reaction zone includes furnishing a nickel-base superalloy article substrate having thereon an initial aluminum-containing coating comprising an initial-coating additive zone and an initial-coating diffusion zone that are substantially free of platinum and palladium. The article is susceptible to the formation of the secondary reaction zone if heated to an elevated SRZ reaction temperature for an SRZ reaction period of time. The initial-coating additive zone and the initial-coating diffusion zone are thereafter removed. A subsequent aluminum-containing coating is thereafter deposited onto the article substrate. The subsequent aluminum-containing coating includes a subsequent-coating additive zone and a subsequent-coating diffusion zone that are substantially free of platinum and palladium. The article substrate with the subsequent aluminum-containing coating is otherwise susceptible to the formation of the secondary reaction zone if heated to an elevated SRZ reaction temperature for an SRZ reaction period of time. In this embodiment, platinum and palladium are excluded because they increase the activity of aluminum and its tendency to form the SRZ. Other features or process steps as described herein may be utilized in conjunction with this preferred approach.

In yet another embodiment, a method for preparing a coated nickel-base superalloy article that is otherwise susceptible to the formation of a secondary reaction zone includes furnishing a nickel-base superalloy article substrate that is susceptible to the formation of the secondary reaction zone if coated with an aluminum-containing layer and heated to an elevated SRZ reaction temperature for an SRZ reaction period of time. The nickel-base superalloy article substrate is thereafter conditioned to be resistant to the formation of secondary reaction zone by depositing a conditioning material onto a surface of the article substrate, and thereafter removing the conditioning material from the article substrate. A subsequent aluminum-containing coating is thereafter deposited onto the article substrate. The subsequent aluminum-containing coating includes a subsequent-coating additive zone and a subsequent-coating diffusion zone. The article substrate with the subsequent aluminum-containing coating is otherwise susceptible to the formation of the secondary reaction zone if heated to an elevated SRZ reaction temperature for an SRZ reaction period of time. Other features or process steps as described herein may be utilized in conjunction with this preferred approach.

The present approach provides for the deposition of the initial aluminum-containing coating, and removing the additive zone and the diffusion zone of that initial aluminum-containing coating. This processing modifies the newly exposed surface of the article substrate such that, when the subsequent aluminum-containing coating is deposited and then heated in conditions that would otherwise cause the formation of the secondary reaction zone, no secondary reaction zone is formed. The present approach may be used either by applying the initial aluminum-containing coating to condition the surface of the article substrate, or to repair and recover the article substrate in the event that the initial aluminum-containing coating has been improperly applied.

Other features and advantages of the present invention will be apparent from the following more detailed description of the preferred embodiment, taken in conjunction with the accompanying drawings, which illustrate, by way of example, the principles of the invention. The scope of the invention is not, however, limited to this preferred embodiment.

DETAILED DESCRIPTION OF THE INVENTION

Figure 1:
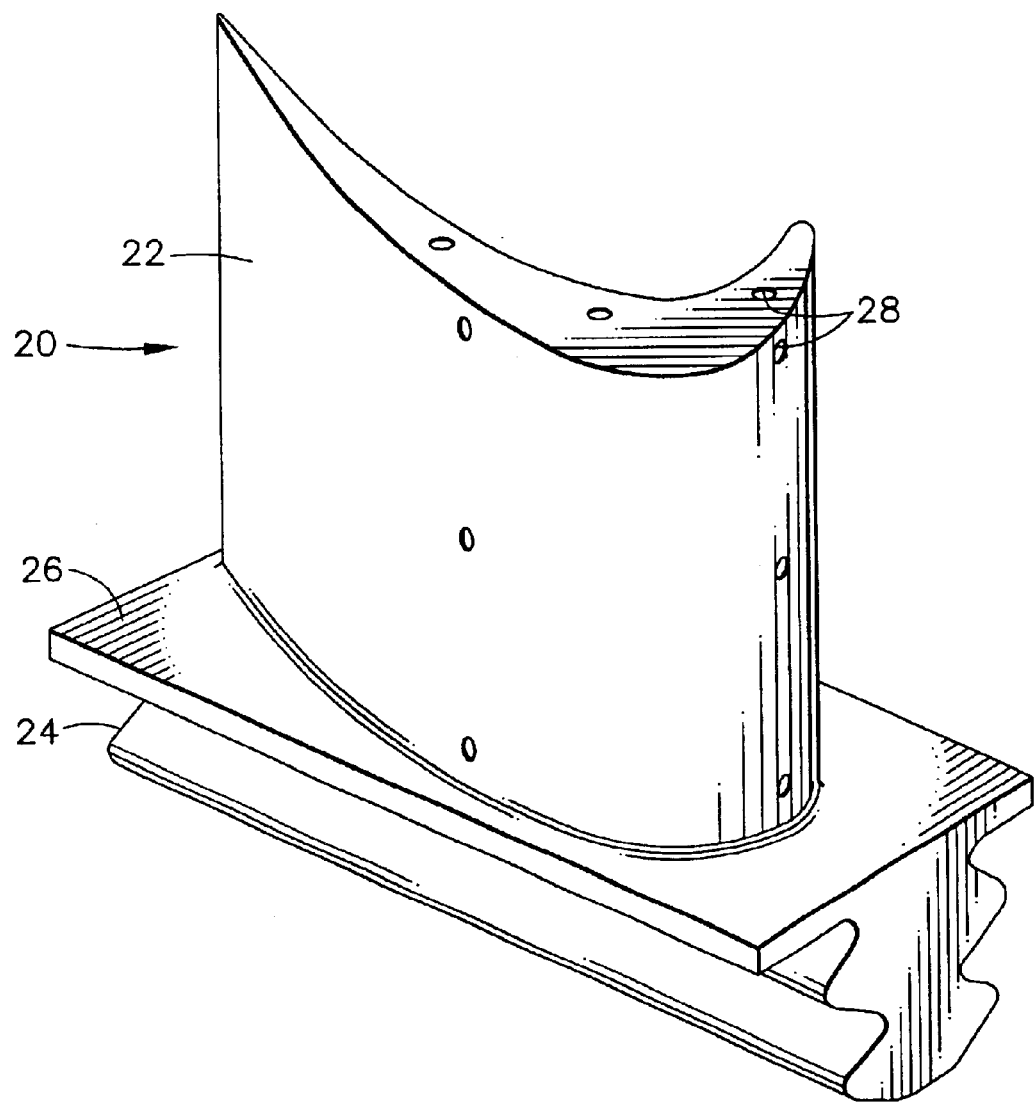
FIG. 1 is a perspective view of a gas turbine blade.

FIG. 1 depicts a component article of a gas turbine engine such as a turbine blade or turbine vane, and in this illustration a high pressure turbine (HPT) blade 20. The turbine blade 20 is formed of any operable material, but is preferably a nickel-base superalloy that is susceptible to the formation of secondary reaction zone (SRZ) when coated with an aluminum-containing protective coating by processes other than that described herein. The turbine blade 20 includes an airfoil section 22 against which the flow of hot exhaust gas is directed. (The turbine vane or nozzle has a similar appearance in respect to the pertinent airfoil section, but typically includes other end structure to support the airfoil.) The turbine blade 20 is mounted to a turbine disk (not shown) by a dovetail 24 which extends downwardly from the airfoil 22 and engages a slot on the turbine disk. A platform 26 extends longitudinally outwardly from the area where the airfoil 22 is joined to the dovetail 24. The interior of the airfoil 22 is typically hollow with connecting openings 28 in the surface of the airfoil 22. During service, a flow of cooling air is directed through the hollow interior and out the openings 28 to reduce the temperature of the airfoil 22. A rotating shroud may be found at the end of the airfoil 22 remote from the dovetail 24 in some versions of the turbine blade.

Figure 2:
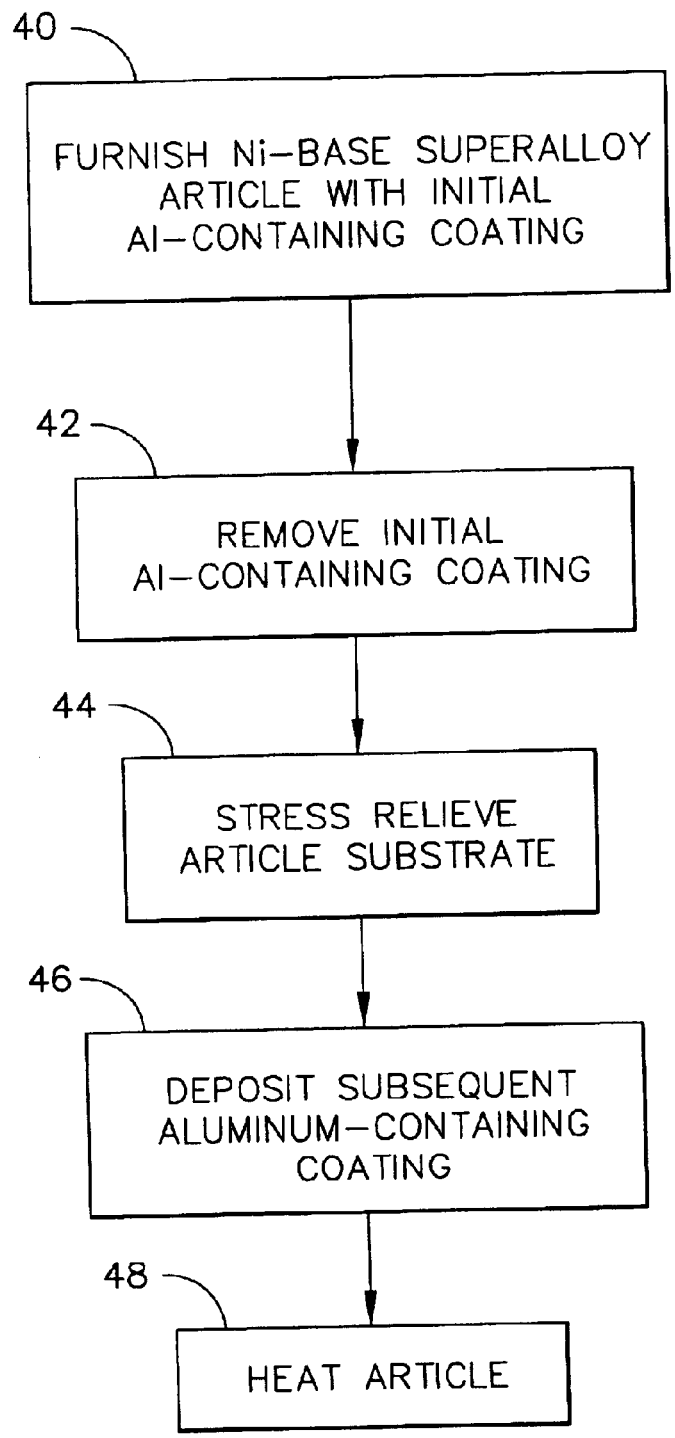
FIG. 2 is a block flow diagram of a preferred approach for practicing the invention.
Figure 3:
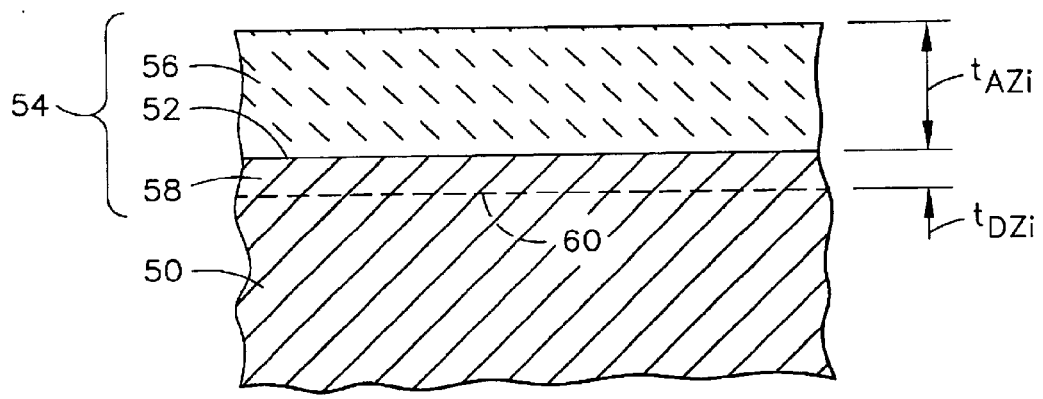
FIGS. 3–5 are schematic sectional views of the structure at various points in the processing of FIG. 2.

FIG. 2 depicts a preferred approach to preparing a coated superalloy article such as the turbine blade 20. A nickel-base superalloy article substrate made of a material that is otherwise susceptible to the formation of SRZ when coated with an aluminum-containing coating is furnished, numeral 40. Such a nickel-base superalloy article substrate typically has a rhenium content of not less than about 4.0 percent by weight. The article substrate preferably has the shape and dimension of a component of a gas turbine engine such as the gas turbine blade 20 shown in FIG. 1, and is preferably a single crystal-article. The article substrate 50 having a surface 52 is shown in FIG. 3. This surface 52 is an initial surface of the article substrate 50, and is contrasted with a newly exposed surface that is later created and will be discussed subsequently.

The article is made of a nickel-base superalloy with the indicated rhenium content of not less than about 4.0 weight percent that is potentially subject to the formation of the deleterious SRZ if not properly coated, upon heating to an elevated SRZ reaction temperature for an SRZ reaction period of time. As used herein, "nickel-base" means that the composition has more nickel present than any other element. The nickel-base superalloys are typically of a composition that is strengthened by the precipitation of gamma-prime phase. The preferred nickel-base alloy is alloy René N6, which has a nominal composition in weight percent of about 12.5 percent cobalt, about 4.2 percent chromium, about 1.4 percent molybdenum, about 5.75 percent tungsten, about 5.4 percent rhenium, about 7.2 percent tantalum, about 5.75 percent aluminum, about 0.15 percent hafnium, about 0.05 percent carbon, about 0.004 percent boron, about 0.01 percent yttrium, balance nickel and incidental impurities.

The nickel-base superalloy article substrate 50 has thereon an initial aluminum-containing coating 54 comprising an initial-coating additive zone 56 and an initial-coating diffusion zone 58, as seen in FIG. 3. Preferably, the initial-coating additive zone 56 has an average aluminum content of greater than about 27 percent by weight, and a ratio of a thickness $t_{AZi}$ of the initial-coating additive zone 56 to a thickness $t_{DZi}$ of the initial-coating diffusion zone 58 is greater than about 3:1. (The thicknesses of the initial-coating additive zone 56 and the initial-coating diffusion zone 58 may be determined from the etched metallographic microstructure. The location of the surface 52 is marked by remnant oxides and other particles, so that its precise location may be visualized in a metallographic section.) This initial aluminum-containing coating 54 may be applied by any approach, and a preferred approach is that described below for depositing the subsequent aluminum-containing coating, which discussion is incorporated here.

The inventors have determined that when the article substrate 50 having such an initial aluminum-containing coating 54 is heated to a sufficiently high temperature for a sufficiently long period of time, such as 2050° F. for 50 hours or 2000° F. for 400 hours, the SRZ will form at an interface 60 of the initial-coating diffusion zone 58 with the base metal of the substrate article 50, and extending further into the base metal. The SRZ is deleterious to the properties of the article substrate. The SRZ may form whether or not the article substrate is stress relieved prior to coating.

Figure 4:
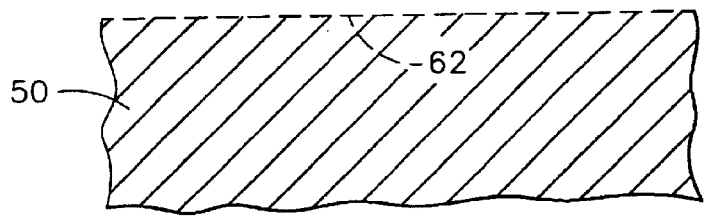

To "repair" this coated material, initial aluminum-containing coating 54, including the initial-coating additive zone 56 and the initial-coating diffusion zone 58, is removed, numeral 42 of FIG. 2, to produce the structure illustrated in FIG. 4. The initial-coating additive zone 56 and the initial-coating diffusion zone 58 are preferably removed by a combination of acid etching and surface preparation to expose a newly exposed surface 62. The newly exposed surface 62 is preferably at about the same location as the initial diffusion zone interface 60 of FIG. 3, but it may be slightly displaced therefrom. For typical nickel-base superalloys, the initial aluminum-containing coating 54 may be removed by etching in nitric acid at room temperature. During this process and after a period of time in the acid etch solution, a passivation layer forms at the exposed surface. The passivation layer inhibits further removal of the metal by the etch process. At this point, the article is taken out of the acid and the passivation layer is removed by any appropriate technique, without introducing substantial cold work and residual stress into the surface and the underlying material. The article is again contacted to the acid, and metal is removed until another passivation layer forms, and the new passivation layer is removed. This process is repeated until both the initial-coating additive zone 56 and the initial-coating diffusion zone 58 have been removed.

To ensure that no cold work and residual stress remain in the exposed base metal, the article substrate 50 may optionally be heated to a stress-relieving temperature of from about 2050° F. to about 2150° F. for a stress-relieving time of from about 30 minutes to about 6 hours, numeral 44 of FIG. 2. Step 44 may be omitted if it is certain that no cold work and residual stress have been introduced into the article substrate 50.

The resulting structure has the base metal of the article substrate 50 exposed at the newly exposed surface 62 rather than the initial surface 52. The base metal of the article substrate 50 at this newly exposed surface 62 is different than that at the originally exposed surface 52, as a result of the removal of the initial-coating additive zone 56 and the initial-coating diffusion zone 58 with the substrate 50.

Figure 5:
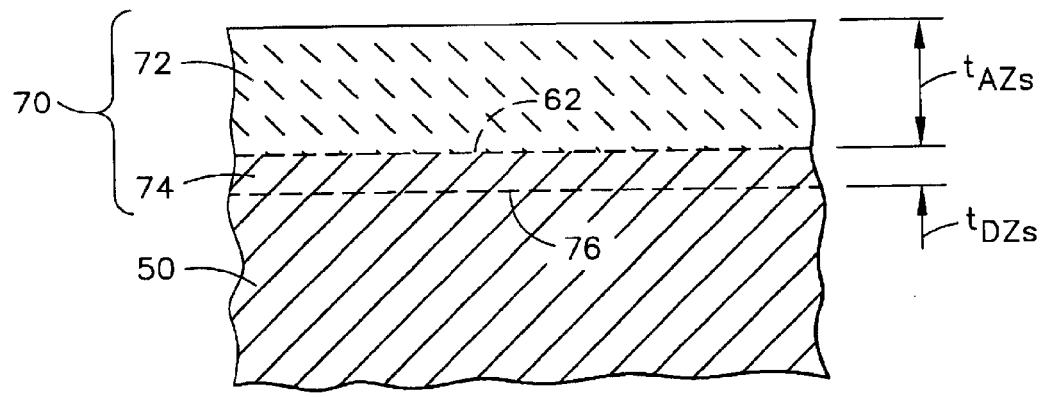

A subsequent aluminum-containing coating 70 is deposited onto the article substrate 50, numeral 46 of FIG. 2, producing the structure of FIG. 5. The subsequent aluminum-containing coating 70 includes a subsequent-coating additive zone 72 and a subsequent-coating diffusion zone 74. There is a subsequent diffusion zone interface 76 with the base metal article substrate 50. The subsequent diffusion zone interface 76 is not at the same location as the initial diffusion zone interface 60. The article substrate 50 with the subsequent aluminum-containing coating 70 is otherwise susceptible to the formation of the secondary reaction zone if heated to an elevated SRZ reaction temperature for an SRZ reaction period of time. Preferably, the subsequent-coating additive zone 72 has an average aluminum content of greater than about 27 percent by weight, and a ratio of a thickness $t_{AZs}$ of the subsequent-coating additive zone 72 to a thickness $t_{DZs}$ of the subsequent-coating diffusion zone 74 of greater than about 3:1. (The thicknesses of the subsequent-coating additive zone 72 and the subsequent-coating diffusion zone 74 may be determined from the etched metallographic microstructure. The newly exposed surface 62 is marked by remnant oxides and other particles, so that its precise location may be visualized in the metallographic section.)

The subsequent aluminum-containing coating 70 is deposited at an elevated temperature by depositing pure aluminum or an aluminum-containing alloy onto the exposed surface of the article substrate 50, which at this point, after the removal step 42, is the newly exposed surface 62. The aluminum deposition is accomplished by vapor phase aluminiding (VPA) or by chemical vapor deposition (CVD). The basic approach is disclosed, for example, in U.S. Pat. No. 6,332,926, whose disclosure is incorporated by reference. A finely divided mixture of aluminum metal, aluminum alloy, or aluminum-containing compound, together with a halide activator, preferably aluminum fluoride, is placed into a source chamber portion of a retort. Upon heating, the activator vaporizes to form a halide gas. The halide gas contacts the aluminum metal, aluminum alloy, or aluminum-containing compound to form the corresponding aluminum halide gas.

Aluminide-modifying elements such as hafnium, zirconium, yttrium, silicon, titanium, tantalum, cobalt, chromium, platinum, palladium, and combinations thereof, may optionally be doped from similar sources into the gaseous source, or separately deposited by other techniques such as plating or physical vapor deposition. Although precious metals such as platinum and palladium may be present, it is preferred that they are not present in the initial aluminum-containing coating 54 or the subsequent aluminum-containing coating 70. Metals such as platinum and palladium increase the activity of aluminum, potentially increasing the susceptibility of the base metal/coating combination to the formation of SRZ.

In CVD, argon or hydrogen gas is flowed into the source chamber, providing a carrier for the aluminum-containing gas, while in VPA typically no carrier gas is used. The resulting source gas contacts the newly exposed surface 62 of the article substrate 50, depositing aluminum or an aluminum-containing alloy thereon. The retort is usually heated to a deposition reaction temperature of from about 1825° F. to about 1925° F. during the deposition step 46 so that deposited aluminum atoms and modifier atoms interdiffuse into the article substrate 50 to form the subsequent-coating diffusion zone 74. The subsequent aluminum-containing coating 70 about 0.002 inch thick may be deposited in about 4–8 hours using this approach. Optionally, the heating may be continued after the flow of aluminum-source gas is discontinued, to achieve further interdiffusion.

Alternatively, the subsequent-coating additive zone 72 may be deposited to have an average aluminum content of not greater than about 27 percent by weight, at a deposition temperature of from about 1925° F. to about 2000° F.

Other operable approaches for depositing the subsequent aluminum-containing coating 70 may also be used. Examples include slurry-coating processes and above-the-pack aluminiding.

Preferably but optionally, the article substrate 50 with the subsequent aluminum-containing coating 70 thereon is heated to the SRZ elevated reaction temperature for the SRZ reaction period of time, numeral 48. This heating typically occurs during service.

The present approach of FIG. 2 has been practiced to prepare alloy René N6 turbine blades 20 coated with the subsequent aluminum-containing coating 70. Upon heating to the SRZ elevated reaction temperature for the SRZ reaction period of time, no SRZ is observed. This result is quite surprising and unexpected. The substrate 50 with the initial aluminum-containing coating 54 thereon, when heated to the SRZ reaction temperature for the SRZ reaction period of time produces the SRZ, while the substrate 50 with the subsequent aluminum-containing coating 70 thereon does not produce substantial amounts of the SRZ. As seen by comparing FIGS. 3 and 5 and their discussions above, the two structures appear visually to be identical, yet that of FIG. 3 produces the deleterious SRZ and that of FIG. 5 does not. That is, the formation of the SRZ may be suppressed by coating the surface of the article substrate with the initial aluminum-containing coating 54 on the surface 52, removing that coating, and then depositing the same type of aluminum-containing coating 70 on the newly exposed surface 62. The initial aluminum-containing coating 54 and its removal thus serve to condition the article substrate 50 against the formation of the SRZ when the subsequent aluminum-containing coating 70 is deposited and then heated to the SRZ temperature and for the SRZ period of time.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. A method for preparing a coated nickel-base superalloy article that is otherwise susceptible to the formation of a secondary reaction zone, the method comprising the steps of furnishing a nickel-base superalloy article substrate having thereon an initial aluminum-containing coating comprising an initial-coating additive zone and an initial-coating diffusion zone, the article being susceptible to the formation of the secondary reaction zone if heated to an elevated SRZ reaction temperature for an SRZ reaction period of time; thereafter removing the initial-coating additive zone and the initial-coating diffusion zone to expose a newly exposed surface of the article substrate that is substantially without cold work and residual stress; and thereafter depositing a subsequent aluminum-containing coating onto the newly exposed surface of the article substrate, the subsequent aluminum-containing coating including a subsequent-coating additive zone and a subsequent-coating diffusion zone, the article substrate with the subsequent aluminum-containing coating being otherwise susceptible to the formation of the secondary reaction zone if heated to the elevated SRZ reaction temperature for the SRZ reaction period of time.

2. The method of claim 1, wherein the step of furnishing includes the step of furnishing the nickel-base superalloy article having a rhenium content of not less than about 4.0 percent by weight.

3. The method of claim 1, wherein the step of furnishing includes the step of furnishing the nickel-base superalloy article made of the alloy René N6, which has a nominal composition in weight percent of about 12.5 percent cobalt, about 4.2 percent chromium, about 1.4 percent molybdenum, about 5.75 percent tungsten, about 5.4 percent rhenium, about 7.2 percent tantalum, about 5.75 percent aluminum, about 0.15 percent hafnium, about 0.05 percent carbon, about 0.004 percent boron, about 0.01 percent yttrium, balance nickel and incidental impurities.

4. The method of claim 1, wherein the step of removing includes the step of removing the initial-coating additive zone and the initial-coating diffusion zone without introducing cold work into the article substrate.

5. The method of claim 1, wherein the step of removing includes the step of removing the initial-coating additive zone and the initial-coating diffusion zone using an acid.

6. The method of claim 1, including an additional step, after the step of removing and before the step of depositing, of stress relieving the article substrate.

7. The method of claim 1, including an additional step, after the step of depositing a subsequent aluminum-containing coating, of heating the article substrate with the subsequent aluminum-containing coating thereon to the SRZ elevated reaction temperature for the SRZ reaction period of time.

8. A method for preparing a coated nickel-base superalloy article that is otherwise susceptible to the formation of a secondary reaction zone, the method comprising the steps of furnishing a nickel-base superalloy article substrate having thereon an initial aluminum-containing coating comprising an initial-coating additive zone and an initial-coating diffusion zone that are substantially free of platinum and palladium, the article being susceptible to the formation of the secondary reaction zone if heated to an elevated SRZ reaction temperature for an SRZ reaction period of time; thereafter removing the initial-coating additive zone and the initial-coating diffusion zone; and thereafter depositing a subsequent aluminum-containing coating onto the article substrate, the subsequent aluminum-containing coating including a subsequent-coating additive zone and a subsequent-coating diffusion zone that are substantially free of platinum and palladium, the article substrate with the subsequent aluminum-containing coating being otherwise susceptible to the formation of the secondary reaction zone if heated to the elevated SRZ reaction temperature for the SRZ reaction period of time.

9. The method of claim 8, wherein the step of furnishing includes the step of furnishing the nickel-base superalloy article having a rhenium content of not less than about 4.0 percent by weight.

10. The method of claim 8, wherein the step of furnishing includes the step of furnishing the nickel-base superalloy article made of the alloy René N6, which has a nominal composition in weight percent of about 12.5 percent cobalt, about 4.2 percent chromium, about 1.4 percent molybdenum, about 5.75 percent tungsten, about 5.4 percent rhenium, about 7.2 percent tantalum, about 5.75 percent aluminum, about 0.15 percent hafnium, about 0.05 percent carbon, about 0.004 percent boron, about 0.01 percent yttrium, balance nickel and incidental impurities.

11. The method of claim 8, wherein the step of removing includes the step of removing the initial-coating additive zone and the initial-coating diffusion zone without introducing cold work into the article substrate.

12. The method of claim 8, wherein the step of removing includes the step of removing the initial-coating additive zone and the initial-coating diffusion zone using an acid.

13. The method of claim 8, including an additional step, after the step of removing and before the step of depositing, of stress relieving the article substrate.

14. The method of claim 8, wherein the step of removing includes the step of removing the initial-coating additive zone and the initial-coating diffusion zone while introducing cold work into the article substrate, and wherein the method includes an additional step, after the step of removing and before the step of depositing, of stress relieving the article substrate.

15. The method of claim 8, including an additional step, after the step of depositing a subsequent aluminum-containing coating, of heating the article substrate with the subsequent aluminum-containing coating thereon to the SRZ elevated reaction temperature for the SRZ reaction period of time.

16. A method for preparing a coated nickel-base superalloy article that is otherwise susceptible to the formation of a secondary reaction zone, the method comprising the steps of furnishing a nickel-base superalloy article substrate that is susceptible to the formation of the secondary reaction zone if coated with an aluminum-containing layer and heated to an elevated SRZ reaction temperature for an SRZ reaction period of time; thereafter conditioning the nickel-base superalloy article substrate to be resistant to the formation of secondary reaction zone, the step of conditioning including the step of depositing a conditioning material onto a surface of the article substrate, and thereafter removing the conditioning material from the article substrate; and thereafter depositing a subsequent aluminum-containing coating onto the article substrate, the subsequent aluminum-containing coating including a subsequent-coating additive zone and a subsequent-coating diffusion zone, the article substrate with the subsequent aluminum-containing coating being otherwise susceptible to the formation of the secondary reaction zone if heated to the elevated SRZ reaction temperature for the SRZ reaction period of time.

17. The method of claim 16, wherein the step of depositing the conditioning material includes the step of depositing an initial aluminum-containing coating comprising an initial-coating additive zone and an initial-coating diffusion zone.

18. The method of claim 16, wherein the step of depositing a conditioning material includes the step of depositing the conditioning material upon an initial surface of the substrate, and wherein the step of removing the conditioning material includes the step of exposing a newly exposed surface of the article substrate that is different from the initial surface of the substrate.

19. The method of claim 16, wherein the step of furnishing includes the step of furnishing the nickel-base superalloy article having a rhenium content of not less than about 4.0 percent by weight.

20. The method of claim 16, wherein the step of furnishing includes the step of furnishing the nickel-base superalloy article made of the alloy René N6, which has a nominal composition in weight percent of about 12.5 percent cobalt, about 4.2 percent chromium, about 1.4 percent molybdenum, about 5.75 percent tungsten, about 5.4 percent rhenium, about 7.2 percent tantalum, about 5.75 percent aluminum, about 0.15 percent hafnium, about 0.05 percent carbon, about 0.004 percent boron, about 0.01 percent yttrium, balance nickel and incidental impurities.

21. The method of claim 16, wherein the step of depositing a conditioning material includes the step of depositing the conditioning material to form an additive zone and a diffusion zone, and wherein the step of removing includes the step of removing the additive zone and the diffusion zone to expose the surface of the article substrate.

* * * * *